(12) United States Patent
Morisawa et al.

(10) Patent No.: US 6,623,615 B1
(45) Date of Patent: *Sep. 23, 2003

(54) ELECTROLYTIC HYDROGEN DISSOLVED WATER AND METHOD AND APPARATUS OF PRODUCTION THEREOF

(75) Inventors: Shinkatsu Morisawa, Osaka (JP); Sanetaka Shirahata, Fukuoka (JP)

(73) Assignee: Nihon Trim Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,336

(22) Filed: Aug. 25, 1997

(30) Foreign Application Priority Data

Aug. 27, 1996 (JP) .............................. 8-225392
Apr. 11, 1997 (JP) .............................. 9-093451

(51) Int. Cl.[7] ............................... C02F 1/461
(52) U.S. Cl. ............... 205/742; 205/756; 204/257; 204/258
(58) Field of Search ............... 205/742, 756; 204/257, 258, 275

(56) References Cited

U.S. PATENT DOCUMENTS 4,830,721 A * 5/1989 Bianchi et al. ............ 205/748

FOREIGN PATENT DOCUMENTS

| EP | 0470841 A2 | 8/1991 |
|---|---|---|
| EP | 06106169 | 4/1994 |
| EP | 06206074 | 7/1994 |
| EP | 07265859 | 10/1995 |
| EP | 08294689 | 11/1996 |
| JP | 2-11708 | 4/1990 |
| JP | 03-038296 | 2/1991 |
| JP | 06-218371 | 8/1994 |
| JP | 6-273938 | 9/1994 |
| JP | 07-000964 | 1/1995 |
| JP | 07088475 A | 4/1995 |
| JP | 7088475 | 4/1995 |
| JP | 07-108064 | 4/1995 |
| JP | 07-132288 | 5/1995 |
| JP | 07185550 A | 7/1995 |
| JP | 7185550 | 7/1995 |
| JP | 07-185554 | 7/1995 |
| JP | 7-284772 | 10/1995 |
| JP | 08-052473 | 2/1996 |
| JP | 08-155453 | 6/1996 |
| JP | 09-099287 | 4/1997 |
| SU | 1433904 | 10/1988 |
| TW | 152020 | 3/1977 |
| TW | 270921 | 8/1980 |
| TW | 261134 | 8/1982 |
| WO | WO95/07857 | * 3/1995 |

OTHER PUBLICATIONS

Japenese Office Action (no date).

* cited by examiner

*Primary Examiner*—Arun S. Phasge
(74) *Attorney, Agent, or Firm*—McDermott, Will & Emery (57) ABSTRACT

Purified water is obtained from tap water. NaCl is added to the purified water so that the conductivity thereof is at least 100 $\mu$S/cm. Then, electrolysis is applied. The obtained cathode water is output and neutralized. The obtained cathode water includes dissolved hydrogen ($H^+$, H., $H_2$) of at least 0.1 ppm. This dissolved hydrogen prevents or suppresses DNA damage.

10 Claims, 6 Drawing Sheets

ELECTROLYTIC HYDROGEN DISSOLVED WATER AND METHOD AND APPARATUS OF PRODUCTION THEREOF

BACKGROUND OF THE INVENTION

1. Field of the Invention

The present invention generally relates to water containing hydrogen obtained by electrolysis (referred to as electrolytic hydrogen dissolved water hereinafter).

More particularly, the present invention relates to high concentration hydrogen (including hydrogen atoms) dissolved water obtained by electrolysis having the ability to prevent or repair damage of DNA. Also, the present invention relates to a method of producing such electrolytic hydrogen dissolved water. Furthermore, the present invention relates to an apparatus of producing high concentration hydrogen dissolved water by electrolysis.

2. Description of the Background Art

All the living things on earth are referred to as a DNA (Deoxyribo Nucleic Acid) organism. The metabolism of the organism is completely controlled by DNA (gene). It can be said that the life, death, and health of the organism are dominated by DNA. In other words, health implies DNA in a normal state, and disease implies an abnormal state of the DNA.

If the development of means to maintain a normal state of the DNA and to render an abnormal state of the DNA to a normal state achieves success, electrolytic hydrogen dissolved water will be applicable not only to the medical and pharmacy field, but also to various fields such as the food industry and many other unpredictable fields since water can arrive rapidly to all portions in the organism including the lipid membrane (cell membrane) and the blood-brain barrier.

The damage of a DNA cell is relatively small due to the self-guarding effect within the biological body. However, according to independent cell culture research, self-damage occurs to reduce the lifetime of the DNA due to rapid oxidation by free radicals. Vitamin C (ascorbic acid) is conventionally known as the scavenger substance for a free radical.

However, vitamin C per se is converted into a free radical since vitamin C reduces others and is subjected to oxidation. Since this free radical originating from vitamin C participates in the damage of the DNA cell, vitamin C could not be taken as an ideal substance as a scavenger for a free radical.

SUMMARY OF THE INVENTION

The present invention is directed to solve the above-described problems, and has an object of providing electrolytic hydrogen dissolved water ideal for suppressing damage of a DNA cell.

Another object of the present invention is to provide a method of producing such electrolytic hydrogen dissolved water.

A further object of the present invention is to provide an apparatus of producing high concentration hydrogen dissolved water by electrolysis.

According to an aspect of the present invention, electrolytic hydrogen dissolved water includes dissolved hydrogen of at least 0.1 ppm. The water is preferably made neutral.

According to another aspect of the present invention, a method of producing electrolytic hydrogen dissolved water includes the step of preparing raw water (such as tap water) including at least natrium, kalium, magnesium, and calcium ions to obtain purified water from the raw water. An electrolyte is added to promote electrolysis in the purified water. The purified water with the electrolyte added to promote electrolysis is electrolyzed. Then, cathode water is derived.

According to a third aspect of the present invention, an apparatus of producing electrolytic hydrogen dissolved water includes a unit for obtaining purified water from raw water, and an electrolyte supply unit for supplying an electrolyte to promote electrolysis in the purified water. The apparatus further includes a unit to electrolyze the electrolyte added purified water.

It was found that the electrolytic hydrogen dissolved water according to the present invention prevents or suppresses damage of the DNA. It is considered that the hydrogen in the high concentration hydrogen-containing water by electrolysis reduces the radical (superoxide anion radical) that is the cause of DNA damage. The radical is eliminated to prevent or suppress damage of the DNA. The hydrogen per se is oxidized so that the water is harmless to the human body.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

First Embodiment

Figure 1:
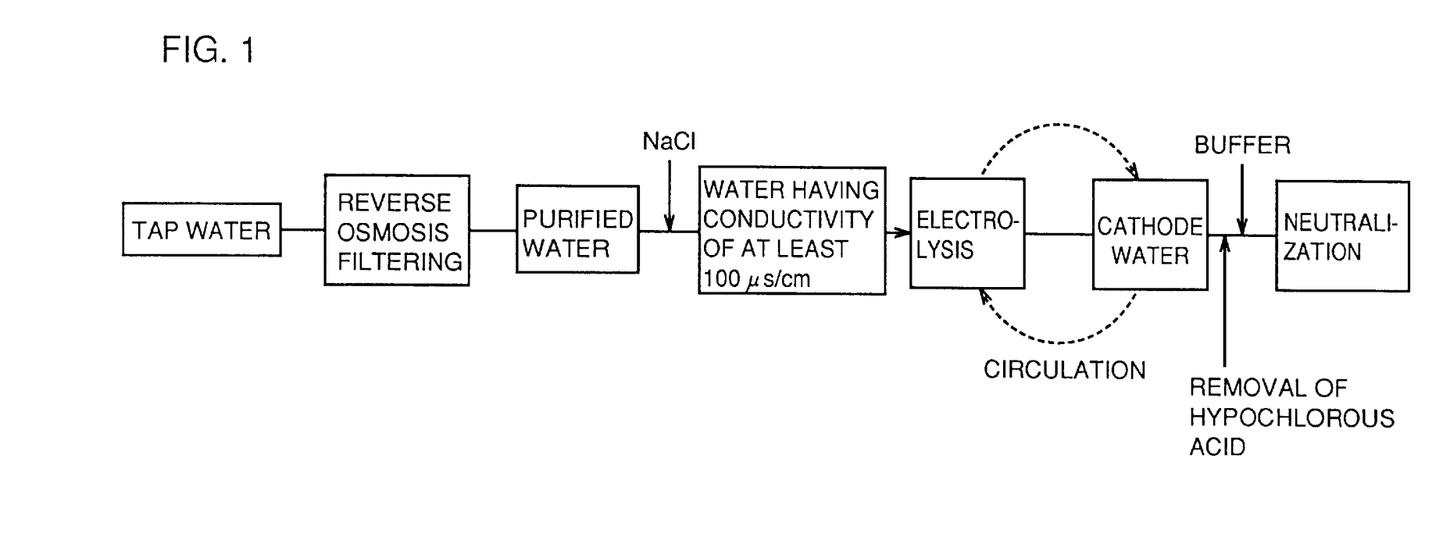
FIG. 1 is a flow chart of the process of producing high concentration hydrogen dissolved water obtained by electrolysis.

FIG. 1 is a diagram showing the flow of producing high concentration hydrogen dissolved water by electrolysis according to the present invention. Referring to FIG. 1, tap water is prepared. The tap water includes at least natrium, kalium, magnesium, and calcium ions. The tap water is distilled or filtered with a reverse osmosis membrane to obtain purified water. NaCl, for example, is added as a electrolyte for promoting electrolysis in the purified water to set the conductivity to at least $100 \mu S/cm$. Then, the purified water is electrolyzed to derive cathode water. At this time point, the derived cathode water is sent back to the cathode chamber to be subjected to electrolysis again, whereby cathode water including electrolytic hydrogen of a higher concentration is obtained. The obtained high concentration hydrogen dissolved water includes dissolved hydrogen ($H^+$, $H.$, $H_2$). The nature thereof is set forth in the following.

ORP (Oxidation-Reduction Potential): −500 mV; PH: 10.8; DH (Dissolved Hydrogen): 1.5 ppm; DO (Dissolved Oxygen): 5.2 ppm; NMR (Nuclear Magnetic Resonance): 50 HZ.

Although NaCl is taken as a electrolyte to promote electrolysis in the above embodiment, the present invention is not limited to this. For example, calcium lactate can be used, provided that a greater amount (20–30 times) than the amount of NaCl is required.

Then, hypochlorous acid included in the cathode water is removed by filtering, using active carbon, degassing, distilling, and the like. Then, a buffer is added to the cathode water for neutralization. The water is neutralized for the purpose of promoting applicability to the human body. Sodium phosphate can be used as the buffer. Alternatively, it has been found that anode water obtained by an anode electrode can be used. The usage of anode water obtained simultaneously with cathode water by electrolysis provides the advantage that water can be used effectively since the anode water does not have to be discharged. There is also the advantage that anode water is harmless and safe to the human body. Preferably, anode water is added to the cathode water so that the pH of the cathode water becomes, for example, 7.2–7.3.

Usage of hydrochloric acid can be considered for the buffer. However, usage of hydrochloric acid will produce NaCl to result in salty cathode water. Therefore, hydrochloric acid is not appropriate for practical usage.

Such water including hydrogen of high concentration by electrolysis is recognized to have the effect of preventing or suppressing damage of the DNA cell.

The characteristics of high concentration hydrogen dissolved water obtained by electrolysis according to the above-described flow under various conditions (high concentration hydrogen dissolved water before a buffer is added) are summarized in Table 1. The values for raw water (tap water) as a comparative example is also shown in Table 1.

TABLE 1

|  | PH | °C. | ORP(mv) | DO | DH(ppm) |
|---|---|---|---|---|---|
| Example 1 | 9.8 | 12.7 | −94 | 7.4 | 0.40~0.45 |
| Example 2 | 10.3 | 13.2 | −247 | 6.6 | 0.69~0.72 |
| Example 3 | 10.4 | 13.2 | −497 | 6.2 | 0.86~0.90 |
| Example 4 | 10.7 | 13.7 | −729 | 4.2 | 1.03~1.06 |
| Comparative Example (Raw Water) | 7.5 | 13.1 | 652 | 10.0 | (2.3µ mg/l) |

Regarding the high concentration hydrogen dissolved water obtained by electrolysis under various conditions, it was found that the high concentration hydrogen dissolved water of the characteristics shown in Table 2 is particularly favorable in reducing the radical (superoxide anion radical) which becomes the cause of DNA damage.

This water containing hydrogen of high concentration is considered to be able to be developed for applications in various fields set forth in the following.

The first is the application in the field of medicine and pharmacy. For example, the water can be used in producing transfusion formulation as well as in the production of other medicine. Also, the water can be used as dialysis treatment solution, peritoneal dialysis solution, and other solutions.

The second is the application in medicine for preventing and treating senescence and retrogressive reformation caused by oxidation of the skin tissue. For example, the water can be used in producing face lotion and other cosmetics and toiletries.

The third is the application in antioxidation food and functional food. For example, the water may be used in producing food.

The fourth is the application in processed drinks and beverages. For example, the usage as drinking water (antioxidation water) is one candidate. Also, usage as the water ingredient of processed drinks such as a can of soft drinks and coffee can be considered.

The fifth is the application to improve contamination and degradation of edibles due to agricultural chemicals, herbicides, insecticides, and the like as well as to maintain freshness. For example, it may be used as a washing agent or rinse before shipment of vegetables, fruits, and the like.

The sixth is the application as an alternative to an antiseptic, preservative, and the like in producing processed edibles. It provides a potential for an alternative to food additives (347 types).

An electrolytic water generator for producing high concentration hydrogen dissolved water will be described hereinafter.

Figure 2:
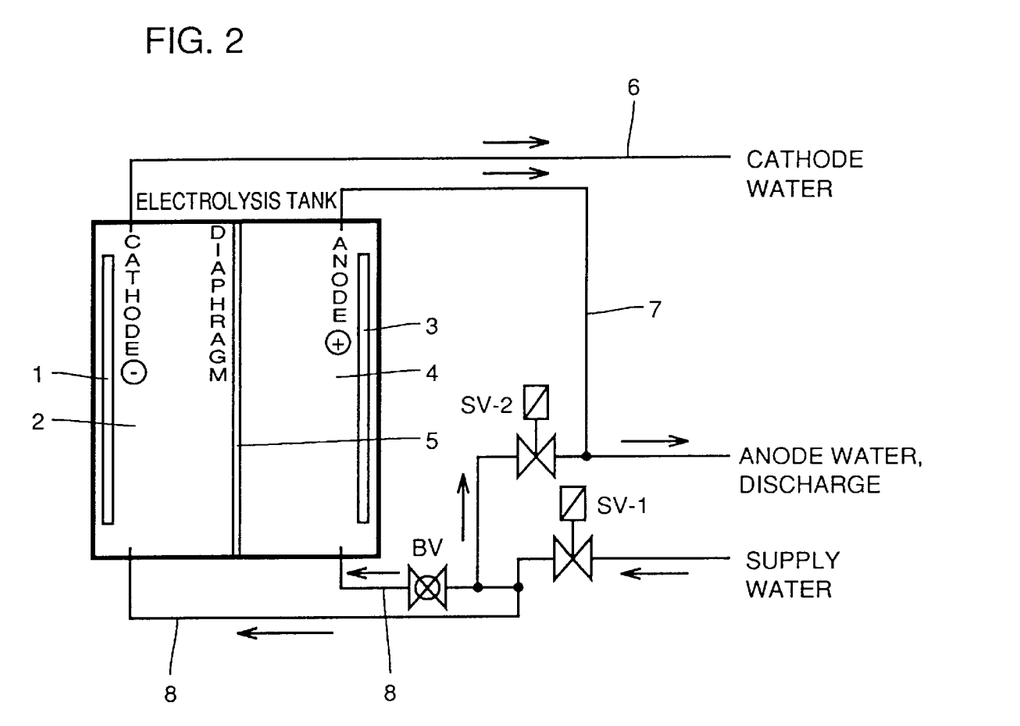
FIG. 2 is a diagram representing the concept of an electrolytic water generator according to a first embodiment of the present invention.

FIG. 2 shows the concept of an electrolytic water generator for generating electrolytic hydrogen dissolved water of the present invention. The electrolytic water generator includes a cathode chamber 2 with a cathode electrode 1, and an anode chamber 4 with an anode electrode 3. Cathode chamber 2 is separated from anode chamber 4 by a diaphragm 5. A cathode water outlet pipe 6 from which cathode water (alkaline water) is drawn out is connected to cathode chamber 2. A drain pipe 7 for discharging anode water (acidic water) outward is connected to anode chamber 4. A feed pipe 8 is connected to respective cathode and anode chambers 2 and 4 so that raw water including at least natrium, kalium, magnesium, and calcium such as tap water, ground water, and water from a well is supplied. By using this electrolytic water generator, raw water is electrolyzed to obtain electrolytic hydrogen dissolved water including dissolved hydrogen ($H^+$, H., $H_2$).

Embodiment 2

Figure 3:
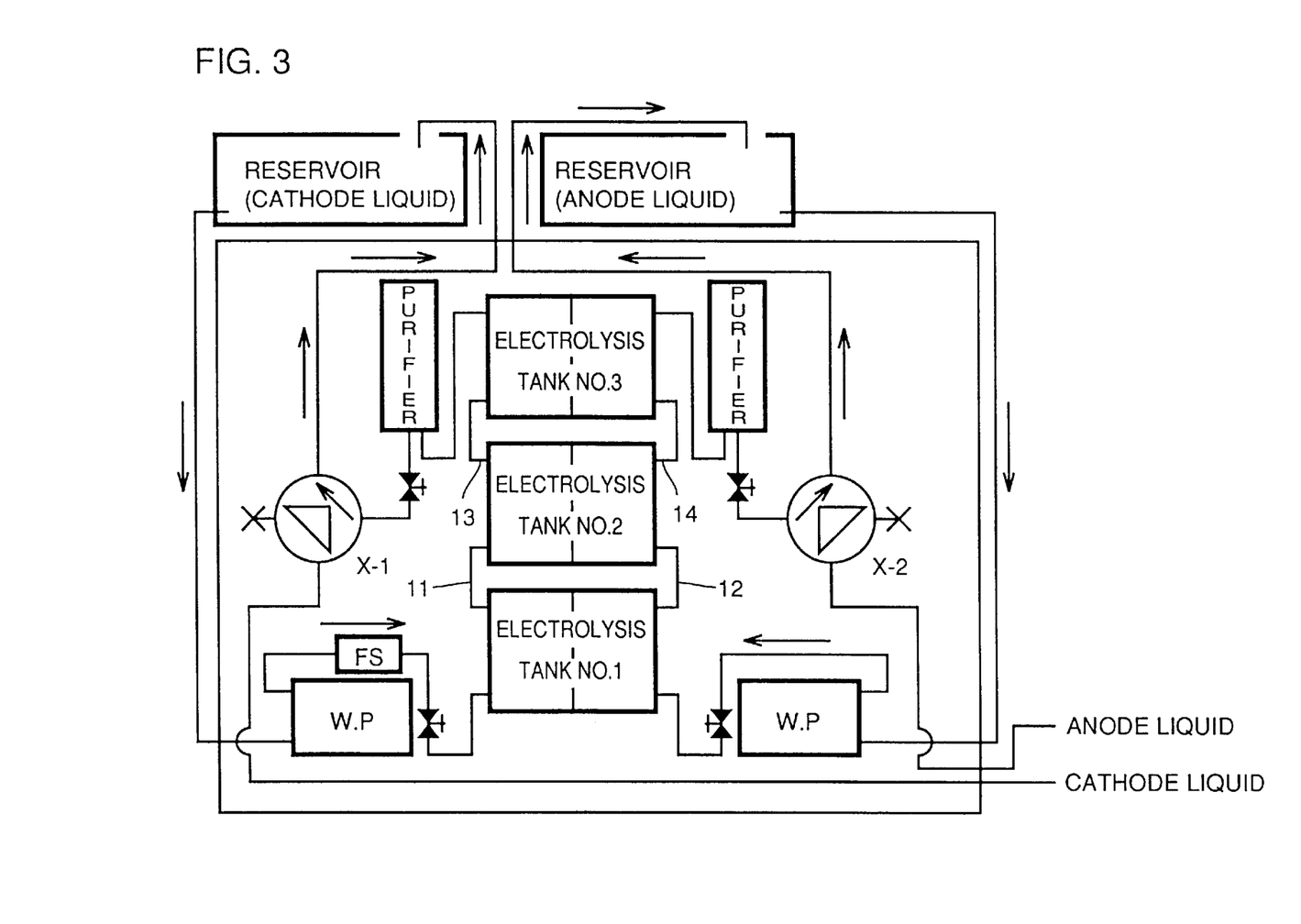
FIG. 3 is a diagram representing the concept of an electrolytic water generator according to a second embodiment of the present invention.

FIG. 3 shows the concept of an electrolytic water generator according to a second embodiment of the present

TABLE 2

|  | DH (ppm) | DO (ppm) | ORP (mv) | Conductivity (µs/cm) | NMR (Hz) | PH |
|---|---|---|---|---|---|---|
| High Concentration Hydrogen Dissolved Water | 0.3~1.0 | 3~6 | −200~−700 | 200~500 | 52~54 | 9~11 |
| Raw Water | 0 | 10 | +300 | 200 | 140~145 | 6.6~6.8 | invention. In contrast to the first embodiment in which only one electrolysis tank is included, the electrolytic water generator according to the second embodiment includes three electrolysis tanks (Nos. 1, 2 and 3). The cathode chamber of the first electrolysis tank (No. 1) and the cathode chamber of the second electrolysis tank (No. 2) are connected through a first pipe 11 to transfer cathode water. The anode chamber of the first electrolysis tank (No. 1) and the anode chamber of the second electrolysis tank (No. 2) are connected through a second pipe 12 to transfer anode water therebetween. The cathode chamber of the second electrolysis tank (No. 2) and the cathode chamber of the third electrolysis tank (No. 3) are connected through a third pipe 13 for transferring cathode water. The anode chamber of the second electrolysis tank (No. 2) and the anode chamber of the third electrolysis tank (No. 3) are connected through a fourth pipe 14 for transferring anode water therebetween. By increasing the number of electrolysis tanks, the concentration of the dissolved hydrogen in the obtained cathode water can be increased. The obtained cathode water and anode water are stored in a reservoir and provided outwards by the opening/closing operation of both values X–1 and X–2. The cathode liquid and anode liquid stored in the reservoir can be returned to the electrolysis tank by a water pump (W.P) to be repeatedly subjected to electrolysis. In the drawing, FS represents a flow sensor.

Embodiment 3

An electrolytic water generator according to a third embodiment of the present invention is an improvement of the electrolytic water generator of FIG. 2, and is shown in FIGS. 4–6B. The electrolytic water generator of FIG. 2 has scale such as calcium and magnesium attached to cathode electrode 1 when used for a long time period to result in reduction in the electrolytic current.

For the purpose of preventing this phenomenon, the method is employed of maintaining the essential performance by inverting manually or automatically the voltage between the electrodes to remove the scale attached to the cathode electrode at a constant time interval of the usage period. However, this method is disadvantageous in that the scale detached from cathode electrode 1 during or after cleaning will float as solids in the alkaline water. It may not be appropriate for usage as the electrolytic hydrogen dissolved water of the present invention.

The third embodiment is directed to improve such a problem. An electrolytic water generator improved so that the scale of calcium, magnesium, and the like do not attach to the electrode is provided.

Figure 4:
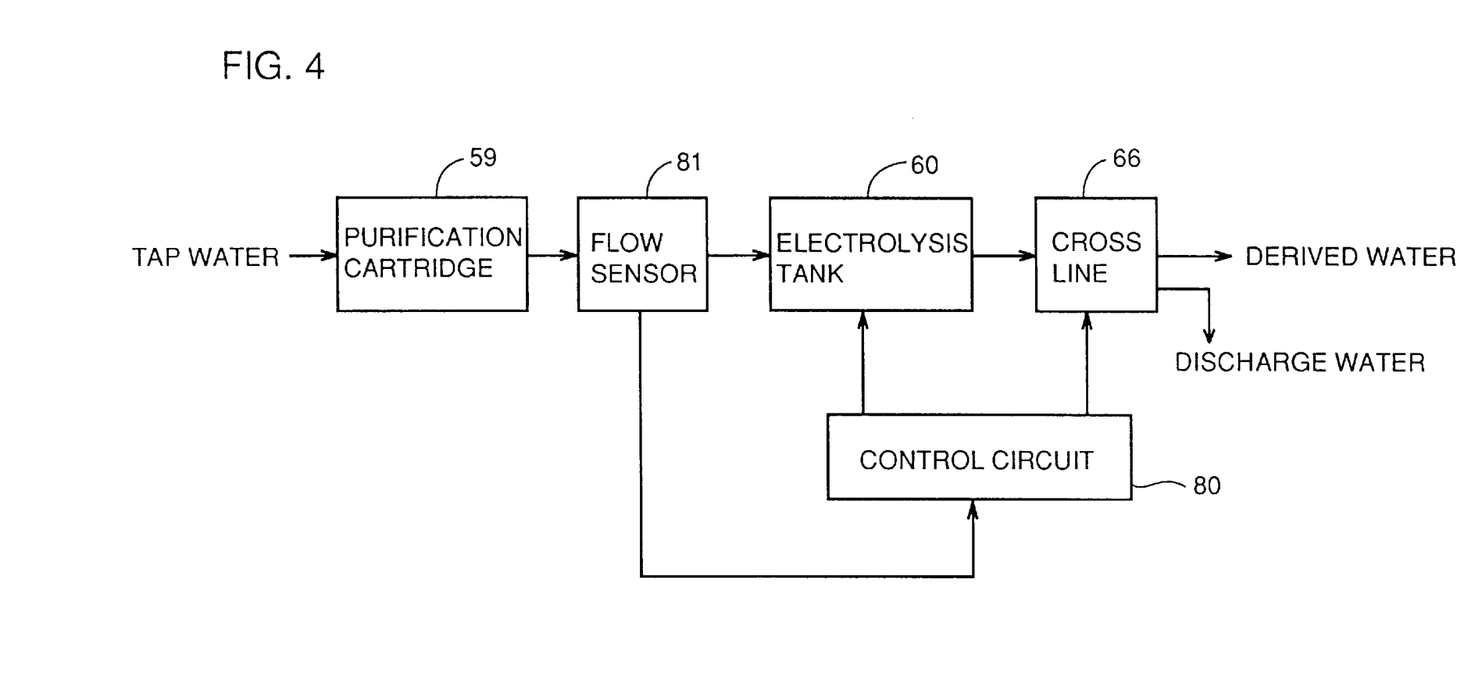
FIG. 4 is a flow chart of generating electrolytic hydrogen dissolved water according to a third embodiment of the present invention.

FIG. 4 is a flow chart of generating electrolytic hydrogen dissolved water according to the third embodiment of the present invention. Tap water is introduced into a purification cartridge 59 to have chlorine and the like removed therefrom. The tap water is sent to electrolysis tank 60. The amount of tap water supplied to electrolysis tank 60 is gauged by a flow sensor 81. In electrolysis tank 60, the tap water is electrolyzed, whereby alkaline water and acidic water are generated.

By a cross line 66 that will be described afterwards, alkaline water is always provided from an alkaline water outlet, and acidic water is always discharged from an acidic water discharge outlet. Electrolysis tank 60 and cross line 66 are connected to a control circuit 80. Control circuit 80 is connected to flow sensor 81. Upon detection of a predetermined amount of flow of tap water by flow sensor 81, control circuit 80 issues an instruction. Control circuit 80 receives this instruction to invert the supply voltage to electrolysis tank 60 and simultaneously operates the valve unit of cross line 66. Accordingly, the alkaline water is always output from the alkaline water outlet, and the acidic water is always discharged from the acidic water discharge outlet. Since the supply voltage can be inverted in a short cycle by the present apparatus, no scale will adhere to the electrode. Since the above-described operation is completely carried out automatically within the mechanical unit, no labor is required.

Figure 5:
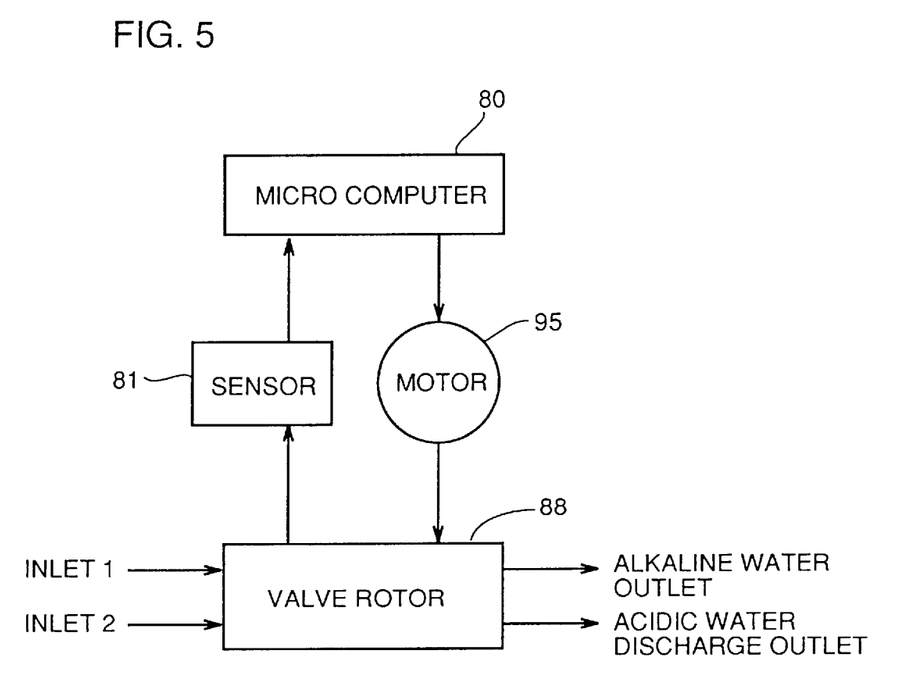
FIG. 5 is a block diagram for operating a valve rotor.

FIG. 5 is a block diagram for describing in further detail the operation of the alkaline water output from the alkaline water outlet, and the acidic water discharged from the acidic water discharge outlet.

A valve rotor 88 functions to operate the cross line which is the switching valve, and is driven by a motor 95. Inlets 1 and 2 are provided so that water (alkaline water, acidic water) from the electrolysis tank enters the cross line. Inlet 1 communicates with the first electrode chamber of the electrolysis tank, and inlet 2 communicates with the second electrode chamber.

Upon introduction of alkaline water from inlet 1 and acidic water from inlet 2, valve rotor 88 is operated so that alkaline water is output from the alkaline water outlet, and acidic water is discharged from the acidic water discharge outlet.

When the supply voltage between the first and second electrodes is inverted so that acidic water is introduced from inlet 1 and the alkaline water is introduced from inlet 2, valve rotor 88 is rotated so that alkaline water is output from the alkaline water outlet and acidic water is discharged from the acidic water discharge outlet.

The time of inverting the supply voltage applied across the first and second electrodes is determined by the amount of tap water introduced into the electrolysis tank detected by sensor 81. When a predetermined amount of tap water is supplied to the electrolysis tank, sensor 81 issues an instruction to microcomputer 80 which is the control circuit. Microcomputer 80 inverts the supply voltage applied across the first and second electrodes, and simultaneously drives motor 95 to rotate valve rotor 88. Thus, alkaline water is constantly output from the alkaline water outlet, and the acidic water is constantly discharged from the acidic water discharge outlet.

Figure 6A:
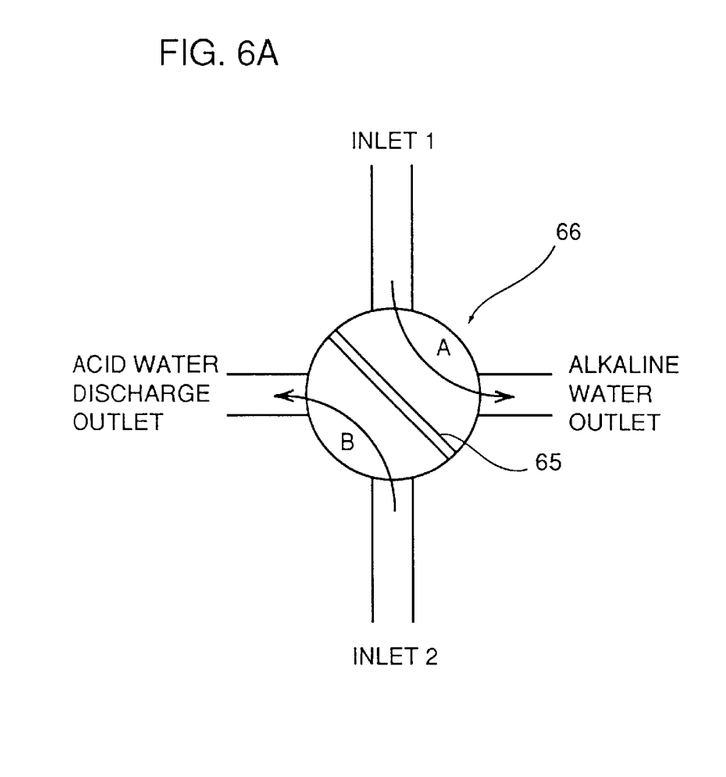
FIGS. 6A and 6B are diagrams for describing an operation of a switching valve.

FIG. 6A is a diagram for describing the operation of a switching valve termed cross line 66. In the drawing, input 1 communicates with the first electrode chamber of the electrolysis tank. Inlet 2 communicates with the second electrode chamber. When alkaline water is introduced through inlet 1 and acidic water is introduced through inlet 2, a first water channel A and a second water channel B open, whereby alkaline water is output from the alkaline water outlet through the first water channel A, and the acidic water is discharged from the acidic water discharge outlet through the second water channel B. It is to be noted that a valve unit 65 is connected to valve rotor 88.

Figure 6B:
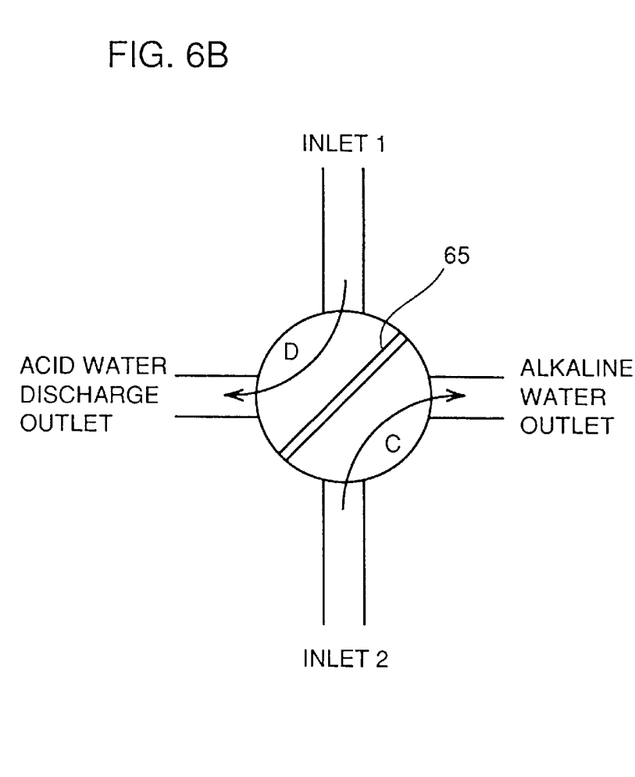

When the supply voltage applied across the first and second electrodes is inverted so that acidic water is introduced from inlet 1 and alkaline water is introduced from inlet 2, valve unit 65 is rotated 90°, whereby third and fourth water channels C and D open as shown in FIG. 6B. As a result, alkaline water is output from the alkaline water outlet, and acidic water is discharged from the acidic water discharge outlet. According to the electrolytic water generator of the third embodiment, the supply voltage across the first and second electrodes is inverted to operate the switching valve, whereby alkaline water is constantly output from the alkaline water outlet. Therefore, electrolytic voltage can be inverted at a short cycle to prevent scale from being attached to the electrode. As a result, electrolytic hydrogen dissolved water without any scale can always be obtained stably.

Since hydrogen ($H^+$, $H.$, $H_2$) of at least 0.1 ppm is included according to the electrolytic hydrogen dissolved water of the present invention, the radical (superoxide anion radical) that is the cause of DNA damage can be reduced to eliminate this radical. Thus, the electrolytic hydrogen dissolved water is applicable in various fields in addition to the field for preventing or suppressing DNA damage. Furthermore, when neutralized, the electrolytic hydrogen dissolved water can easily be applied to the human body.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing electrolytic dissolved hydrogen containing water, comprising the steps of:
    providing raw water including at least sodium, potassium, magnesium and calcium ions,
    obtaining purified water from said raw water,
    adding sodium chloride as an electrolyte to said purified water for promoting electrolysis of said purified water,
    electrolyzing said purified water containing said electrolyte, and then deriving cathode water comprising hypochlorous acid from the purified water; and
    removing the hypochlorous acid from the cathode water by filtering using active carbon, degassing or distilling.

2. The method according to claim 1, further comprising the step of removing hypochlorous acid from said derived cathode water.

3. A method according to claim 1, wherein the amount of said electrolyte added to said purified water to promote electrolysis is adjusted so that conductivity of said purified water is at least 100 $\mu$S/cm.

4. The method according to claim 1, further comprising the step of adding a buffer in said derived cathode water to neutralize said cathode water.

5. The method according to claim 4, wherein water produced with an anode electrode is used as said buffer.

6. The method of providing electrolytic hydrogen dissolved water according to claim 1, wherein the step of obtaining purified water from said raw water includes the step of distilling tap water or filtering tap water by reverse osmosis.

7. An apparatus for producing electrolytic dissolved hydrogen containing water, comprising:
    means for obtaining purified water from raw water,
    sodium chloride supply means for supplying sodium chloride as an electrolyte to promote electrolysis of said purified water,
    means for electrolyzing said purified water containing said electrolyte to derive cathode water containing hypochlorous acid from the purified water, and
    means for removing the hypochlorous acid from the cathode water by filtering using active carbon, degassing or distilling.

8. The apparatus according to claim 7, wherein
    said means for electrolyzing purified water includes first and second electrolysis tanks with a cathode chamber and an anode chamber, respectively,
    said cathode chamber of said first electrolysis tank and said cathode chamber of said second electrolysis tank are connected by a first pipe to transfer cathode water therebetween, and
    said anode chamber of said first electrolysis tank and said anode chamber of said second electrolysis tank are connected by a second pipe to transfer anode water therebetween.

9. The apparatus for producing electrolytic hydrogen dissolved water according to claim 7, wherein said means for obtaining purified water from raw water included means for distilling tap water or means for filtering tap water by reverse osmosis.

10. An apparatus for producing electrolytic dissolved hydrogen containing water, comprising:
    means for obtaining purified water from raw water,
    catalyst supply means for supplying a catalyst to promote electrolysis of said purified water, and
    means for electrolyzing said purified water containing said catalyst,
    wherein said means for electrolyzing purified water applies a voltage between first and second electrodes separated by a diaphragm to electrolyze the purified water to generate alkaline water and acidic water, further comprising:
        an alkaline water outlet for providing said alkaline water,
        an acidic water discharge outlet for discharging said acidic water,
        a first electrode chamber including said first electrode,
        a second electrode chamber including said second electrode,
        a first water channel provided between said alkaline water outlet and said first electrode chamber for conducting a flow of electrolytic water generated at said first electrode chamber towards said alkaline water outlet,
        a second water channel provided between said acidic water discharge outlet and said second electrode chamber for conducting a flow of electrolytic water generated at said second electrode chamber towards said acidic water discharge outlet,
        a third water channel provided between said alkaline water outlet and said second electrode chamber for conducting a flow of electrolytic water generated at said second electrode chamber towards said alkaline water outlet,
        a fourth water channel provided between said acidic water discharge outlet and said first electrode chamber for conducting a flow of electrolytic water generated at said first electrode chamber towards said acidic water discharge outlet,
        a switching valve for switching the water channel so that said third and fourth water channels are closed when said first and second water channels are open, and said third and fourth water channels are opened when said first and second water channels are closed, and
        control means so that said switching valve is operated when the polarity of said supply voltage applied between said first and second electrodes is reversed, whereby alkaline water can be always output from said alkaline water outlet.

* * * * *